Sept. 30, 1958   M. BELAMIN   2,854,616
FLUX REVERSAL CIRCUITS FOR MECHANICAL RECTIFIERS
Filed Nov. 2, 1955
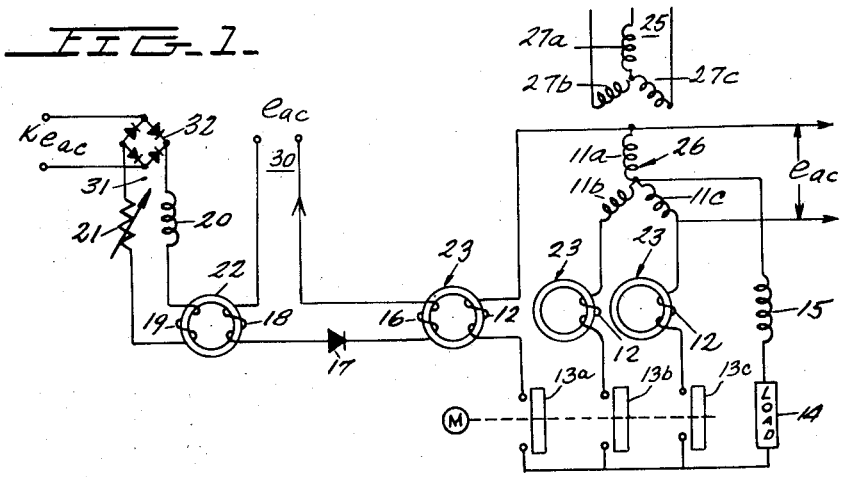
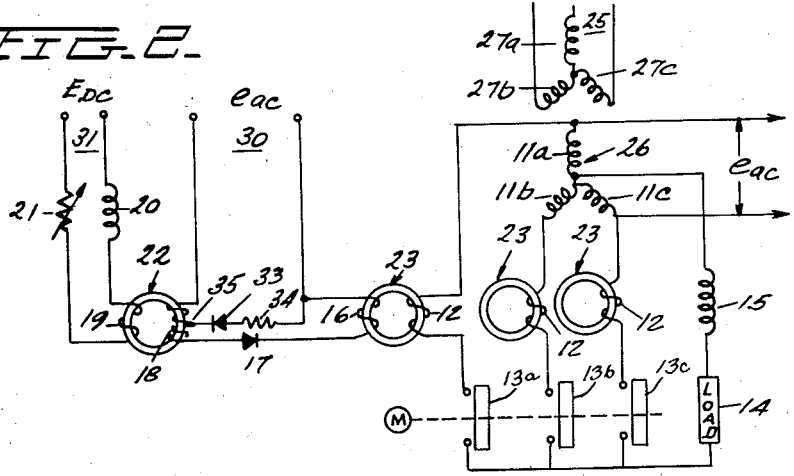
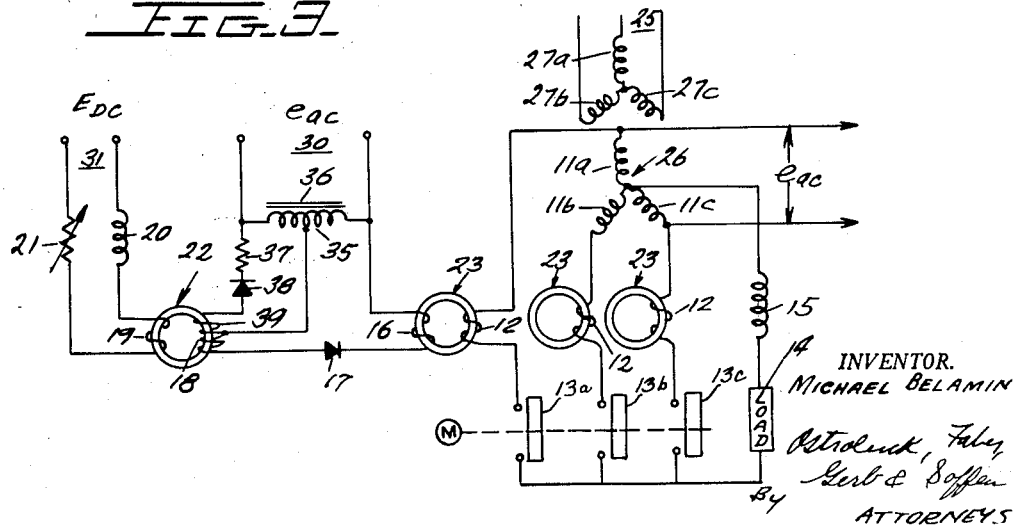
INVENTOR.
MICHAEL BELAMIN
Ostrolenk, Faber,
Gerb & Soffen
BY
ATTORNEYS United States Patent Office 2,854,616
Patented Sept. 30, 1958

2,854,616

FLUX REVERSAL CIRCUITS FOR MECHANICAL RECTIFIERS

Michael Belamin, Nurnberg, Germany, assignor to Siemens-Schuckertwerke A. G., Berlin and Erlangen, Germany, a corporation of Germany Application November 2, 1955, Serial No. 544,507

Claims priority, application Germany November 15, 1954

11 Claims. (Cl. 321—48)

My invention relates to flux reversal circuits for mechanical rectifiers and is more specifically directed to an improvement over the flux reversal circuit shown in copending application Serial No. 486,243, filed February 4, 1955, and assigned to the assignee of the instant invention.

The above noted application discloses a flux reversal circuit which is subject to the disadvantage of varying the output voltage of the rectifier responsive to fluctuation in the input alternating voltage. The instant invention is specifically directed to a connection in which the flux reversal circuit control is made a function of the input alternating voltage in such a way that voltage regulation or degree of flux reversal of the commutating reactor is maintained constant even though the input alternating voltage is varied.

The operation of flux reversal circuits in electromagnetic or mechanical rectifiers is as follows:

In both electromagnetic and mechanical rectifiers, rectification is achieved by having a plurality of contacts continuously open and close to control the flow of current to the load. With this type of arrangement, it is desirable to close the contacts at a time when the voltage is very small or zero.

It is possible to close the contacts under zero voltage conditions when the phase voltage between the commutating phases are equal; that is, when the total commutating voltage in the commutating circuit is zero. However, when closing at this most advantageous time, the output voltage of the rectifier is the maximum which is obtainable with this circuit and thus voltage control is not possible unless achieved by other means; that is, by merely closing the contacts when the control angle (alpha) is zero will not give the voltage control which is essential for efficient operation of the rectifier. Thus, it is necessary to provide means whereby a variable make step of the commutating reactor can be achieved for this voltage control purpose.

My invention relates to novel circuitry wherein the make step of the commutating reactor can be made variable by minor adjustment of the circuitry.

Basically my novel circuit permits flux reversal in the main commutating reactor so that during the subsequent make step, the core of the commutating reactor is only partially magnetized before the core becomes completely saturated. That is, by preconditioning the commutating reactor with my novel flux reversal circuit, the length of the make step can be appreciably reduced since the core of the commutating reactor has already been partially magnetized.

Without any flux reversal following the break of the contacts, a make step will occur as soon as these contacts are again closed, which make step will have a duration as long as the break step and therefore produce a voltage drop of about thirty (30%) percent in the average mechanical rectifier.

On the other hand, if the flux of the commutating reactor is completely reversed, then no make step will occur on the closing of the contacts and hence the rectifier output will be at its full voltage. However, with this latter arrangement, there is no protection for the contacts during the closing operation and hence same will eventually burn out due to the lack of a make step in the current. Therefore in order to obtain optimum conditions of operation of the rectifier, it is necessary to compromise between a long make step and no make step at all.

With my novel control circuitry, I obtain a variable make step period by varying the amount of the flux reversal in the core of the commutating reactor to thereby permit voltage control in the range of from one hundred (100%) percent to about seventy (70%) percent of the maximum possible output voltage.

Basically, my invention is comprised of a transductor having a D.-C. biasing winding and an output winding which is connected in series with a rectifier and a flux reversal winding of the main commutating reactor.

The series combination of the transductor output winding, the rectifier, and the flux reversal winding of the commutating reactor is energized from an A.-C. source.

The D.-C. winding of the transductor serves to control the transductor so as to alter its hysteresis range of operation on the hysteresis loop.

By altering the magnitude of the D.-C. biasing current, both the time of pulse occurrence and duration of the pulse can be adjusted to thereby alter the degree of flux reversal for the main commutating reactor. By changing the degree of flux reversal of the main commutating reactor, the duration of the make step of this reactor is automatically varied.

With my novel arrangement, I am able to control the transductor with a D.-C. biasing circuit which is magnetically and electrically independent of the commutating reactor.

As above mentioned, an accessory rectifier is placed in the flux reversal circuit which is comprised of the series combination of an alternating current source, output winding of the transductor and flux reversal winding of the commutating reactor. By inserting the accessory rectifier in the flux reversal circuit, current will flow through the flux reversal winding in only one direction. Since either the transductor or the commutating reactor will be unsaturated during the positive half cycle of the voltage feeding the flux reversal circuit, the magnitude of current flowing through the flux reversal winding will be small and maintained at step value.

By providing an arrangement in which the magnitude of current flowing through the flux reversal winding prior to the flux reversal operation is maintained at a minimum value, the necessity of a neutralizing winding for the commutating reactor is eliminated. Hence, the construction of the commutating reactor is simplified thereby reducing its expense and complexity.

I have found, however, that the above circuitry is subject to the disadvantage of amplifying variations in the A.-C. input to the rectifying device at the D.-C. output. This may be seen from the following consideration:

If the input alternating voltage is increased, the voltage appearing on the transductor output winding will be increased and accordingly the flux of the transductor core will be reversed over a decreased time interval. Upon reversal of the transductor flux, the alternating voltage will fall upon the flux reversal winding of the commutating reactor, this voltage being impressed thereupon for a correspondingly longer amount of time and at a higher voltage magnitude. That is to say, an appreciably greater number of volt seconds will be impressed upon the flux reversal winding of the commutating reactor. This will then operate to reduce the available make step of the commutating reactor to thereby appreciably increase the output voltage of the rectifier.

It is therefore seen that a slight variation in the alternating current input of the rectifier which is also applied to the transductor output winding is greatly amplified in the output voltage of the unit. In many rectifier applications, however, this non-linearity between a variation in the input voltage and the variation in the output voltage is extremely undesirable.

I have found that I can make this relationship a more linear one by making the transducer D.-C. bias a function of the input alternating voltage. Hence my invention can be seen to impart a more linear relationship between the input voltage and output voltage of the mechanical rectifier in considering the following:

Assume first that the input alternating voltage of the mechanical rectifiers increased. This would mean that the alternating voltage to the transductor winding would be increased but so would the D.-C. bias voltage to the transductor be increased. Accordingly the D.-C. bias winding will reverse a greater amount of flux in the transductor core. Since the input alternating voltage on the transductor output winding must now reverse a greater amount of flux, it is clear that it will take a longer time for the transductor core to saturate and a smaller voltage time interval in spite of the larger voltage magnitude will be impressed upon the flux reversal winding of the commutating reactor than would have been impressed if the transductor flux had been reversed by a D.-C. bias having a fixed magnitude.

By judicious circuit design it is now apparent that the volt seconds applied to the flux reversal winding of the commutating reactor can be so correlated with the input alternating voltage and output D.-C. voltage that a linear relationship could be maintained therebetween. A simple extension of this novel principle could in fact maintain the D.-C. output at a constant value even though the alternating input voltage is subjected to wide variations.

Accordingly a primary object of my invention is to provide a novel circuit arrangement whereby the degree of flux reversal of the main commutating reactor can be varied.

Another object of my invention is to provide a novel arrangement whereby a transductor is used to control the degree of magnetization of the commutating reactor, this transductor being so controlled as to insure a predetermined relationship between the input alternating voltage of a mechanical rectifier and an output direct voltage regardless of fluctuations in the input alternating voltage.

A still further object of my invention is to provide a novel flux reversal circuit having a series connected rectifier wherein the control of the magnitude of the D.-C. biasing voltage automatically controls the variation of the make step of the main commutating reactor, this D.-C. biasing voltage varying according to variation in the alternating voltage input to the mechanical rectifier.

These and other objects of my invention will be apparent from the following description when taken in connection with the drawings in which Figure 1 is a circuit diagram of my invention and illustrates a flux reversal circuit which is associated with one phase of a three phase mechanical rectifier, the flux reversal circuits for the other phases being eliminated for clarity.

Figure 2 is similar to Figure 1 and shows a variation in the manner by which the D.-C. transductor bias may be varied in accordance with the input alternating voltage.

Figure 3 is similar to both Figures 1 and 2 and shows a still further variation of my novel invention.

Referring now to Figure 1, I have shown a three phase mechanical rectifier to which my flux reversal circuit may be applied.

It will be apparent to those skilled in the art that my novel circuit can also be applied to an electromagnetic rectifier in substantially the same manner as will hereinafter be described.

The main A.-C. source 25 is applied to the primary windings 27a, 27b and 27c of the star connected three phase transformer 26. The secondary windings 11a, 11b and 11c of the transformer 26 are respectively connected to the main winding 12 of the commutating reactor 23 and have the mechanically operated contacts 13 connected in series therewith. Contacts 13 could, if desired, be synchronously driven into and out of contact engagement by a synchronous motor schematically illustrated as motor M and as is more fully set forth in copending application Serial No. 301,880, filed July 31, 1952. The series combination of the mechanically operated contacts 13 and the main commutating reactor winding 12 are in turn connected to the one end of the load 14. The opposite end of the load 14 is connected to a smoothing choke 15 which in turn is connected to the secondary neutral of the transformer 26.

I have illustrated my invention as applied to phase A of the rectifier as it will be apparent that the identical circuitry will also be applied to the commutating reactors of phases B and C.

The commutating reactor 23 is provided with a flux reversal winding 16 which is connected in series with the accessory rectifier 17 and an output winding 18 of the transductor 22.

The series combination of the flux reversal winding 16, the rectifier 17 and the output winding 18 are energized from the alternating current source 30. The transductor 22 has a biasing winding 19 which is energized from a direct current source 31 through variable resistor 21 and reactor 20. The D.-C. circuit comprising the D.-C. source 31, the reactor 20, variable resistor 21 and the D.-C. biasing winding 19 is used to control the transductor 22, i. e., to alter its range of operation of the hysteresis loop.

In accordance with my novel invention, the D.-C. source 31 is shown as being energized by the rectifier 32 which in turn is energized from a source of voltage, the magnitude of which is proportional to the input alternating voltage of the rectifier. This voltage is shown in Figure 1 as being equal to $Ke_{A.C.}$ It will be noted that the rectifier 17 may be a diode or any other type sufficient to prevent reverse flow of current when subjected to the voltage $e_{A.C.}$ As is fully described in the above noted co-pending application Serial No. 486,243, the D.-C. output voltage to load 14 of the mechanical rectifier of Figure 1 is determined by the amount of flux that must be reversed by winding 12 of commutating reactor 23 after contact closure of contact 13a.

The amount of flux that is to be reversed by winding 12 is in turn determined by the amount of flux that was previously reversed by the winding 16 of the flux reversal circuit of the commutating reactor 23. If then an appreciable amount of flux must be reversed by the winding 12 after contact closure of contact 13a, the alternating voltage will remain on the winding 12 for a relatively long time and upon saturation of the commutating reactor 23 a reduced voltage will appear on the load 14. Conversely, if only a small amount of flux need be reversed after contact closure, it is clear that the load 14 will have a relatively large portion of the alternating voltage impresesed thereupon.

In the operation of Figure 1, it is seen that the control transductor 22 has a predetermined amount of flux reversed by the D.-C. bias winding 19. This amount of flux reversal is determined solely by the magnitude of the D.-C. voltage impressed across the winding 19. When the A.-C. voltage at source 30 is in such a direction as to cause current flow through the rectifier 17, its voltage will fall across the winding 18 since the magnetizing current of the transductor winding 18 is appreciably smaller than the magnetizing current of the winding 16.

Clearly the volt seconds required of the source 30 to saturate the control transductor 22 is determined by the transductor D.-C. bias on the winding 19. Once the transductor 22 is saturated, the volt seconds of the source 30 are impressed upon the flux reversal winding 16 of the commutating reactor 23 and reverses a portion of the flux of the commutating reactor prior to the make interval of the contact 13.

In view of the above remarks, it is apparent that the amount of flux which is reversed at the winding 16 is a function of the voltage $e_{A.C.}$ which appears at terminals 30 as well as the D.-C. voltage which determines the voltage time area which will be absorbed at the winding 18 prior to the time that the voltage $e_{A.C.}$ may be impressed upon the winding 16.

If now the voltage $e_{A.C.}$ is increased due to some external cause, and the D.-C. voltage is maintained constant, it is seen that in view of the higher voltage impressed upon winding 18 that this transductor will be saturated in a shortened interval of time. Therefore a voltage time area of greater duration and higher magnitude is impressed upon the winding 16 to thereby reverse a considerably larger amount of flux than was reversed prior to the increase of the alternating voltage.

In view of this larger amount of flux reversal, the make step produced at winding 12 is shortened thereby allowing an increased output voltage to apear across the load 14. Hence the voltage across load 14 will now be increased first because of the proportionality between the input alternating voltage and the output D.-C. voltage for a given degree of flux reversal as well as because of the change in the voltage regulation of the unit as explained above.

When, however, the D.-C. bias voltage of the transductor 22 is, as is shown in Figure 1, made to be a function of the input alternating voltage, it is seen that upon an increase in the input alternating voltage that the D.-C. bias across the winding 19 of transductor 22 is increased. In view of this increase a greater amount of flux must be reversed at the winding 18 by the alternating voltage of the terminals 30. Because of this larger amount of flux which is to be reversed by the voltage $e_{A.C.}$ of source 30, the voltage appearing across the flux reversal winding 16 of the commutating reactor 23 acts for a short period of time since it took a longer of period of time to saturate the transductor 22.

By appropriate circuit design it is clear that the amount of flux reversed at winding 16 of the commutating reactor 23 can be made equal to the amount of flux reversed by the previously smaller alternating voltage of the source 30, thereby maintaining the voltage regulation of the unit constant. Hence the increase in output voltage at load 14 will be independent of voltage control and will depend only on this increase in the alternating voltage of the transformer 26.

This principle can be further extended, if desired, in such a manner as to have fewer volt seconds reversed at the winding 16 for an increased alternating current to thereby increase the voltage regulation of the unit for an increase in the input voltage. In this manner it is clear that a constant D.-C. output voltage may be maintained even though the input alternating voltage is varied. That is to say, with the increase in output voltage, the load 14 can be decreased by voltage regulation, this decrease offsetting the increase that would be imparted to the load 14 by the increase in the input voltage at transformer 26.

Reference to Figure 2 indicates a second embodiment of my novel invention in which a D.-C. source of constant magnitude may be used and a second D.-C. source for supplying the variable portion of the D.-C. bias as a function of the A.-C. voltage is provided by the rectifier 33 and current limiting resistor 34. Utilization of the circuit of Figure 2 would allow a different range of voltage relationship to be used between the input alternating voltage and output D.-C. voltage. It is seen in the circuit of Figure 2 that the rectifier 33 is so connected as to supply ampere turns to the portion 35 of transductor winding 18 when the rectifier 17 has the A.-C. voltage impressed thereupon in its blocking direction.

Although in the case of Figure 2 the second D.-C. source is shown as connected to winding 35, it is understood that this connection could be made on winding 19, or if desired on a separate winding.

The circuit of Figure 3 is similar to that of Figure 2 in that it allows the use of a main D.-C. source of biasing voltage which is constant magnitude and has a second source of biasing voltage which includes winding 35 of the auto transformer 36, current limiting resistor 37, and rectifier 38.

Here again a different range of relationship between the input alternating voltage and the output D.-C. voltage of the rectifier may be obtained than that available with the circuit of Figure 1 or Figure 2. It is seen that in the case of Figure 3, as was true in the case of Figure 2 that the rectifier 38 is so connected as to be incapable of interfering with the transductor operation while flux reversal takes place on the winding 16. That is to say, while the rectifier 17 blocks the input voltage at terminal 30, the diode 38 conducts a D.-C. current to allow an additional D.-C. biasing voltage to be impressed upon portion 39 of winding 18, this voltage being a function of the input alternating voltage.

If the auto transformer 36 were made variable, the range of relationship between the output D.-C. voltage and input alternating voltage could be adjusted as desired. That is to say, the second D.-C. source which includes rectifier 38 could be energized from an adjustable portion of the input A.-C. voltage.

In the foregoing I have described my invention only in connection with preferred embodiments thereof. Since many variations and modifications of the principles of my invention within the scope of the description herein are obvious, I prefer to be bound not by the specific disclosure herein but only by the appended claims.

I claim:

1. In a rectifier device for energizing a D.-C. load from a first A.-C. source, said rectifier comprising a commutating reactor, a pair of cooperable contacts and means for synchronously operating said cooperable contacts into and out of engagement; said commutating reactor comprising a main winding, a flux reversal winding and a magnetic core; said first A.-C. voltage source, commutating reactor winding, a pair of cooperable contacts and D.-C. load being connected in series; a flux reversal circuit, said flux reversal circuit including a transductor having a bias winding and an output winding, a diode, a second alternating voltage source and a direct voltage source; said second alternating voltage source being connected in series with said transductor output winding, said diode and said commutating reactor flux reversal winding; said D.-C. voltage source being connected in series with said transductor bias winding, said second alternating voltage source being constructed to have a voltage magnitude as a function of the voltage magnitude of said first A.-C. source; said direct voltage source being constructed to have a voltage magnitude as a function of the voltage magnitude of said first A.-C. source.

2. In a rectifier device for energizing a D.-C. load from a first A.-C. source, said rectifier comprising a commutating reactor, a pair of cooperable contacts and means for synchronously operating said cooperable contacts into and out of engagement; said commutating reactor comprising a main winding, a flux reversal winding and a magnetic core; said first A.-C. voltage source, commutating reactor winding, pair of cooperable contacts and D.-C. load being connected in series; a flux reversal circuit, said flux reversal circuit including a transductor having a bias winding and an output winding, a diode, a second alternating voltage source and a direct voltage source; said second alternating voltage source being connected in series with said transductor output winding, said diode and said commutating reactor flux reversal winding; said D.-C. voltage source being connected in series with said transductor bias winding, said second alternating voltage source being constructed to have a voltage magnitude proportional to the magnitude of the voltage magnitude of said first A.-C. source; said direct voltage source being constructed to have a voltage magnitude proportional to the magnitude of the voltage magnitude of said first A.-C. source.

3. In a rectifier device for energizing a D.-C. load from a first A.-C. source, said rectifier comprising a commutating reactor, a pair of cooperable contacts and means for synchronously operating said cooperable contacts into and out of engagement; said commutating reactor comprising a main winding, a flux reversal winding and a magnetic core; said first A.-C. voltage source, commutating reactor winding, pair of cooperable contacts and D.-C. load being connected in series; a flux reversal circuit, said flux reversal circuit including a transductor having a bias winding and an output winding, a diode, a second alternating voltage source and a direct voltage source; said second alternating voltage source being connected in series with said transductor output winding, said diode and said commutating reactor flux reversal winding; said D.-C. voltage source being connected in series with said transductor bias winding, said second alternating voltage source being constructed to have a voltage magnitude proportional to the magnitude of the voltage magnitude of said first A.-C. source; said direct voltage source being constructed to have a voltage magnitude proportional to the margnitude of the voltage magnitude of said first A.-C. source, an increase in the voltage magnitude of said first A.-C. source being effective to increase the voltage magnitude of each of said second A.-C. source and said D.-C. source according to a predetermined magnitude.

4. In a rectifier device for energizing a D.-C. load from a first A.-C. source, said rectifier comprising a commutating reactor, a pair of cooperable contacts and means for synchronously operating said cooperable contacts into and out of engagement; said commutating reactor comprising a main winding, a flux reversal winding and a magnetic core; said first A.-C. voltage source, commutating reactor winding, pair of cooperable contacts and D.-C. load being connected in series; a flux reversal circuit, said flux reversal circuit including a transductor having a bias winding and an output winding, a diode, a second alternating voltage source and a direct voltage source; said second alternating voltage source being connected in series with said transductor output winding, said diode and said commutating reactor flux reversal winding; said D.-C. voltage source being connected in series with said transductor bias winding, said second alternating voltage source being constructed to have a voltage magnitude as a function of the voltage magnitude of said first A.-C. source; said direct voltage source being constructed to have a voltage magnitude as a function of the voltage magnitude of said first A.-C. source, the voltage magnitudes of each of said direct voltage and alternating voltage being interrelated whereby variation of flux in said commutating reactor core due to said flux reversal winding is maintained constant regardless of variations of voltage magnitude of said first alternating voltage source.

5. In a rectifier device for energizing a D.-C. load from a first A.-C. source, said rectifier comprising a commutating reactor, a pair of cooperable contacts and means for synchronously operating said cooperable contacts into and out of engagement; said commutating reactor comprising a main winding, a flux reversal winding and a magnetic core; said first A.-C. voltage source, commutating reactor winding, pair of cooperable contacts and D.-C. load being connected in series; a flux reversal circuit, said flux reversal circuit including a transductor having a bias winding and an output winding, a diode, a second alternating voltage source and a first and second direct voltage source; said second alternating voltage source being connected in series with said transductor output winding, said diode and said commutating reactor flux reversal winding; said first D.-C. voltage source being connected in series with said transductor bias winding, the voltage of said second D.-C. voltage source being impressed across at least a portion of said transductor output winding, said second alternating voltage source being constructed to have a voltage magnitude as a function of the voltage magnitude of said first A.-C. source; said second direct voltage source being constructed to have a voltage magnitude as a function of the voltage magnitude of said first A.-C. source.

6. In a mechanical rectifier for energizing a D.-C. load from an A.-C. source, said rectifier comprising a commutating reactor, pair of cooperable contacts and means for synchronously operating said pair of cooperable contacts into and out of engagement; said commutating reactor comprising a main winding, a flux reversal winding and a magnetic core, said A.-C. source, commutating reactor winding, pair of cooperable contacts and D.-C. load being connected in series; a flux reversal circuit, said flux reversal circuit including a transductor having a bias winding and an output winding, a first diode and a first and second D.-C. source; said A.-C. voltage source being connected in series with said transductor output winding, said first diode and said commutating reactor flux reversal winding; said first D.-C. voltage source being connected in series with said transductor bias winding, the voltage of said second D.-C. source being impressed across at least a portion of said transductor output winding; said second D.-C. voltage source comprising a series connected second diode and current limiting means; said A.-C. source, series connected second diode and current limiting means and portion of transductor output winding being connected in series; said first and second diodes being connected whereby said second diode blocks current flow due to said A.-C. source when said first diode passes current due to said A.-C. source.

7. In a mechanical rectifier for energizing a D.-C. load from an A.-C. source, said rectifier comprising a commutating reactor, pair of cooperable contacts and means for synchronously operating said pair of cooperable contacts into and out of engagement; said commutating reactor comprising a main winding, a flux reversal winding and a magnetic core, said A.-C. source, commutating reactor winding, pair of cooperable contacts and D.-C. load being connected in series; a flux reversal circuit, said flux reversal circuit including a transductor having a bias winding and an output winding, a first diode and a first and second D.-C. source; said A.-C. voltage source being connected in series with said transductor output winding, said first diode and said commutating reactor flux reversal winding; said first D.-C. voltage source being connected in series with said transductor bias winding, the voltage of said second D.-C. source being impressed across at least a portion of said transductor output winding; said second D.-C. voltage source comprising a series connected second diode and current limiting means; and an auto-transformer, said auto-transformer having a primary and a secondary winding; said A.-C. source being connected across said auto-transformer primary winding; said auto-transformer secondary winding, series connected second diode and current limting means and portion of transductor output winding being connected in series; said first and second diodes being connected whereby said second diode blocks current flow due to said A.-C. source when said first diode passes current due to said A.-C. source.

8. A rectifier having a commutating reactor, main contacts and a transductor; said commutating reactor having a flux reversal winding and a main winding; said transductor having a biasing winding and an output winding; said transductor output winding and said commutating reactor flux reversal winding connected in series with a rectifier and an alternating current source; said biasing winding connected in series with a variable impedance and a direct current source; said main winding of said commutating reactor connected in series with said main contacts; said variable impedance effective to adjust the make step for said main contacts, said direct current source being energized from said alternating source whereby the voltage of said direct current source varies in accordance with variations in said alternating current source.

9. A flux reversal circuit for a mechanical rectifier comprising a transductor, a biasing winding, an output winding, a rectifier, and a flux reversal winding; said biasing winding and said output winding magnetically associated with said transductor; said biasing winding energized from a direct current source; said output winding, said rectifier and said flux reversal winding connected in series with an alternating current source; said flux reversal winding controlling a flux linkage of a commutating reactor for said mechanical rectifier; said direct current source and said biasing winding controlling said transductor to determine the magnitude of said flux linkage, said direct current source being energized from said alternating source whereby the voltage of said direct current source varies in accordance with variations in said alternating current source.

10. A flux reversal circuit for a mechanical rectifier comprising a transductor, a biasing winding, an output winding, a rectifier, and a flux reversal winding; said biasing winding and said output winding magnetically associated with said transductor; said biasing winding energized from a direct current source; said output winding, said rectifier and said flux reversal winding connected in series with an alternating current source; said flux reversal winding controlling a flux linkage of a commutating reactor for said mechanical rectifier; said direct current source and said biasing winding controlling said transductor to determine the magnitude of said flux linkage; a second D.-C. source, said second D.-C. source being connected across at least a portion of one of said transductor windings, said second direct current source being energized from said alternating source whereby the voltage of said direct current source varies in accordance with variations in said alternating current source.

11. In a rectifier having contacts with an engaged and disengaged position, a commutating reactor and a transductor; said commutating reactor having a main winding connected in series with said contacts; said transductor having an output winding connected in series with a flux reversal winding of said commutating reactor; an accessory rectifier connected in series with an alternating current source and said series combination of said output winding and said flux reversal winding; said accessory rectifier permitting current flow in only one direction through said output winding and said flux reversal winding; a biasing winding for said transductor energized from a direct current source to thereby control said transductor; said biasing winding energized by said direct current source through a variable impedance; said flux reversal winding of said commutating reactor linking a portion of the magnetic circuit thereto to thereby prevent complete flux reversal of said commutating reactor prior to the engagement of said contact; said variable impedance effective to control the flux linkage of said commutating reactor prior to the engagement of said contacts; a second D.-C. source, said second D.-C. source being connected across at least a portion of one of said transductor windings, said second direct current source being energized from said alternating source whereby the voltage of said direct current source varies in accordance with variations in said alternating current source.

References Cited in the file of this patent

UNITED STATES PATENTS

| | | |
|---|---|---|
| 2,188,361 | Koppelmann | Jan. 30, 1940 |
| 2,568,140 | Belamin | Sept. 18, 1951 |

FOREIGN PATENTS

| | | |
|---|---|---|
| 497,758 | Great Britain | Dec. 28, 1938 |
| 730,186 | Germany | Jan. 8, 1943 |